(12) United States Patent
Yagi et al.

(10) Patent No.: US 9,935,321 B2
(45) Date of Patent: *Apr. 3, 2018

(54) FUEL CELL AND FUEL CELL STACK

(71) Applicant: NGK SPARK PLUG CO., LTD., Nagoya-shi, Aichi (JP)

(72) Inventors: Hiroaki Yagi, Kounan (JP); Yoshikuni Sato, Nagoya (JP); Nobuyuki Hotta, Konan (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 265 days.

This patent is subject to a terminal disclaimer.

(21) Appl. No.: 14/764,430

(22) PCT Filed: Dec. 26, 2013

(86) PCT No.: PCT/JP2013/007630
§ 371 (c)(1),
(2) Date: Jul. 29, 2015

(87) PCT Pub. No.: WO2014/118866
PCT Pub. Date: Aug. 7, 2014

(65) Prior Publication Data
US 2015/0372319 A1      Dec. 24, 2015

(30) Foreign Application Priority Data

Jan. 31, 2013  (JP) ................ 2013-016488

(51) Int. Cl.
| H01M 8/02 | (2016.01) |
| H01M 8/24 | (2016.01) |
| H01M 8/0247 | (2016.01) |
| H01M 8/242 | (2016.01) |

(Continued)

(52) U.S. Cl.
CPC ....... H01M 8/0247 (2013.01); H01M 8/1004 (2013.01); H01M 8/242 (2013.01); H01M 8/248 (2013.01)

(58) Field of Classification Search
None
See application file for complete search history.

(56) References Cited

U.S. PATENT DOCUMENTS

| 6,444,340 B1 | 9/2002 | Jaffrey |
| 7,294,424 B2 | 11/2007 | Haltiner, Jr. |

(Continued)

FOREIGN PATENT DOCUMENTS

| CA | 2800518 | * 12/2011 |
| DE | 102010023566 A1 | 12/2011 |

(Continued)

OTHER PUBLICATIONS

Machine translation of JP 2007-035498, Feb. 2007.*

(Continued)

*Primary Examiner* — Jonathan Crepeau
(74) *Attorney, Agent, or Firm* — Sughrue Mion, PLLC

(57) ABSTRACT

A fuel cell including a pair of connectors (12, 13); a single cell (20) having an electrolyte layer (2) and electrode layers (14, 15); and current-collecting members (18, 19) disposed between the electrode layers and the connectors, respectively. The current-collecting members (19) corresponding to at least the one electrode layer (15) has connector contact portions (19a) in contact with connector (13), cell contact portions (19b) in contact with electrode layer (15), connection portions (19c) connecting corresponding connector contact portions (19a) and cell contact portions (19b), and a spacer (58) disposed between connector contact portions (19a) and cell contact portion (19b). An end of the spacer (58) located opposite the connection portions (19c) protrudes from at least the ends of the cell contact portions (19b) located opposite the connection portions (19c) or the ends of the connector contact portions (19a) located opposite the connection portions (19c).

13 Claims, 10 Drawing Sheets

(51) Int. Cl.
*H01M 8/1004* (2016.01)
*H01M 8/248* (2016.01)

(56) References Cited

U.S. PATENT DOCUMENTS

| | | | |
|---|---|---|---|
| 9,455,453 B2 * | 9/2016 | Hotta | H01M 8/2475 |
| 9,640,804 B2 * | 5/2017 | Hotta | H01M 2/202 |
| 2007/0231593 A1 | 10/2007 | Ryu et al. | |
| 2009/0226786 A1 | 9/2009 | Selcuk et al. | |
| 2010/0129731 A1 | 5/2010 | Warrier et al. | |
| 2011/0123893 A1 | 5/2011 | Lundblad et al. | |
| 2013/0011766 A1 | 1/2013 | Lundblad et al. | |
| 2014/0170522 A1 * | 6/2014 | Hotta | H01M 8/1213 429/470 |

FOREIGN PATENT DOCUMENTS

| | | |
|---|---|---|
| JP | 2005-339904 A | 12/2005 |
| JP | 2007-035498 A | 2/2007 |
| JP | 2007-250281 A | 9/2007 |
| JP | 2007-265896 A | 10/2007 |
| JP | 2009-266533 A | 11/2009 |
| JP | 2011-54429 A | 3/2011 |
| WO | 2009/025613 A1 | 9/2009 |
| WO | 2011/040875 A1 | 4/2011 |
| WO | WO 2013021629 * | 2/2013 |

OTHER PUBLICATIONS

Office Action dated Sep. 30, 2016 issued by the Canadian Patent Office in counterpart Canadian Patent Application No. 2,899,685.
Communication dated Sep. 30, 2016 issued by the European Patent Office in counterpart European Patent Application No. 13873331.6.
International Search Report for PCT/JP2013/007630 dated Feb. 18, 2014 [PCT/ISA/210].
Office Action dated Jun. 21, 2017 by the Canadian Patent Office in counterpart Canadian Application No. 2,899,685.

* cited by examiner (a)

(b)

FUEL CELL AND FUEL CELL STACK

CROSS-REFERENCE TO RELATED APPLICATION

This application is a National Stage of International Application No. PCT/JP2013/007630 filed Dec. 26, 2013, claiming priority based on Japanese Patent Application No. 2013-016488, filed Jan. 31, 2013, the contents of all of which are incorporated herein by reference in their entirety.

TECHNICAL FIELD

The present invention relates to a fuel cell which includes a single cell configured such that electrode layers are formed on the upper and lower surfaces, respectively, of an electrolyte layer and which generates electricity through supply of fuel gas to one electrode layer (hereinafter, called an anode layer) side and oxidizer gas to the other electrode layer (hereinafter, called a cathode layer) side, as well as to a fuel cell stack in which a plurality of the fuel cells are fixedly stacked.

BACKGROUND ART

Conventionally, as described in, for example, Patent Document 1, there is a fuel cell including a pair of interconnectors; a single cell located between the interconnectors and configured such that a cathode layer is formed on one surface of an electrolyte layer, and an anode layer is formed on the other surface; and current-collecting members disposed between the cathode layer and the interconnector and between the anode layer and the interconnector, respectively, to electrically connect the cathode layer and the interconnector, and the anode layer and the interconnector.

The current-collecting members of the fuel cell have a structure in which nail-like electrically conductive members are raised through cutting from a flat-plate-like current-collecting plate, and the flat surface of the current-collecting plate is joined to the interconnector, while tips of the electrically conductive members are brought in contact with a single cell, thereby establishing electrical connection.

PRIOR ART DOCUMENT

Patent Document

Patent Document 1: Japanese Patent Application Laid-Open (kokai) No. 2009-266533

SUMMARY OF THE INVENTION

Problem to be Solved by the Invention

In some cases, the conventional current-collecting member which is brought in contact with a single cell through elasticity of the electrically conductive members fails to have expected elastic force due to plastic deformation as a result of use over a long period of time, deterioration in strength of the electrically conductive members caused by high-temperature heat generated in the course of generating electricity, and influence of creep deformation on the electrically conductive members. In such a case, the electrically conductive members have failed to follow deformation of the single cell resulting from temperature cycles and fluctuations in fuel pressure and air pressure; as a result, contact has potentially become unreliable, potentially resulting in unreliable electrical connection between the cathode layer and the interconnector or between the anode layer and the interconnector.

Also, in the case of combined occurrence of the above-mentioned causes for deterioration in elastic force of the electrically conductive members, portions of the electrically conductive members expected to come into contact with the single cell may come into contact with the interconnector side; incidentally, the current-collecting member is formed of a material excellent in joining to the interconnector, since the current-collecting member is joined at its flat surface to the interconnector; thus, if, as mentioned above, the electrically conductive members come into contact with the interconnector side in a high-temperature environment in the course of generating electricity, the electrically conductive members may be joined to the interconnector side through sintering in some cases. In such a case, the electrically conductive members are integrated with the interconnector; accordingly, contact with the single cell becomes difficult; therefore, there has been a risk of unreliable electrical connection between the cathode layer and the interconnector or between the anode layer and the interconnector.

The present invention has been conceived in view of the foregoing, and an object of the invention is to provide a fuel cell and a fuel cell stack which can maintain good electrical connection even in use over a long period of time.

Means for Solving the Problem

In order to achieve the above-mentioned object, the present invention provides a fuel cell comprising:
a pair of interconnectors;
a single cell located between the interconnectors and having an electrolyte layer and electrode layers formed on upper and lower surfaces, respectively, of the electrolyte layer; and
current-collecting members disposed between the electrode layers and the interconnectors, respectively, and adapted to electrically connect the corresponding electrode layers and interconnectors;
the fuel cell being characterized in that
the current-collecting member corresponding to at least one of the electrode layers comprises a connector contact portion in contact with the interconnector, a cell contact portion in contact with the electrode layer of the single cell, a connection portion connecting the connector contact portion and the cell contact portion, and a spacer disposed between the connector contact portion and the cell contact portion; and
an end of the spacer located opposite the connection portion protrudes from at least one of an end of the cell contact portion located opposite the connection portion and an end of the connector contact portion located opposite the connection portion.

Also, the above fuel cell may be characterized in that the electrolyte layer is a plate-like one.

In order to achieve the above-mentioned object, as described in a claim, the present invention provides a fuel cell comprising:
a pair of interconnectors;
a single cell located between the interconnectors and having a plate-like electrolyte layer and electrode layers formed on upper and lower surfaces, respectively, of the electrolyte layer; and current-collecting members disposed between the electrode layers and the interconnectors, respectively, and adapted to electrically connect the corresponding electrode layers and interconnectors;

the fuel cell being characterized in that the current-collecting member corresponding to at least one of the electrode layers comprises a connector contact portion in contact with the interconnector, a cell contact portion in contact with the electrode layer of the single cell, a connection portion connecting the connector contact portion and the cell contact portion, and a spacer disposed between the connector contact portion and the cell contact portion; and an end of the spacer located opposite the connection portion protrudes from at least one of an end of the cell contact portion located opposite the connection portion and an end of the connector contact portion located opposite the connection portion.

As described in another claim, the present invention provides a fuel cell according to the aforementioned claim, wherein the end of the spacer located opposite the connection portion protrudes from both of the end of the cell contact portion located opposite the connection portion and the end of the connector contact portion located opposite the connection portion.

As described in another claim, the present invention provides a fuel cell according to any one of the aforementioned claims, wherein, as viewed in plane, at least a portion of the current-collecting member opposite the current-collecting member corresponding to the one electrode layer is in contact with the other electrode layer in a region where the spacer is in contact with the cell contact portion and with the connector contact portion.

As described in another claim, the present invention provides a fuel cell according to any one of the aforementioned claims, wherein, as viewed in plane, the entire region of contact between the cell contact portion and the electrode layer is contained in a region of the spacer.

As described in another claim, the present invention provides a fuel cell according to any one of the aforementioned claims, wherein the spacer is of at least one of mica, alumina felt, vermiculite, carbon fiber, silicon carbide fiber, and silica.

As described in another claim, the present invention provides a fuel cell according to any one of the aforementioned claims, further comprising a tightening member for unitarily tightening a stack of the interconnectors, the single cell, and the current-collecting members, wherein the tightening member and the spacer press the cell contact portion of the current-collecting member against the single cell and the connector contact portion of the current-collecting member against the interconnector.

As described in another claim, the present invention provides a fuel cell according to any one of the aforementioned claims, wherein the spacer is higher in thermal expansion coefficient in a tightening direction than the tightening member.

As described in another claim, the present invention provides a fuel cell according to any one of the aforementioned claims, wherein the current-collecting members are formed of a porous metal, a metal mesh, wire, or a punched metal.

As described in another claim, the present invention provides a fuel cell according to any one of the aforementioned claims, wherein the cell contact portion of the current-collecting member is joined to a surface of the electrode layer of the single cell.

As described in another claim, the present invention provides a fuel cell according to any one of the aforementioned claims, wherein the connector contact portion of the current-collecting member is joined to the interconnector.

As described in another claim, the present invention provides a fuel cell according to any one of the aforementioned claims, wherein the current-collecting member is disposed between the electrode layer corresponding to fuel gas and the interconnector and is formed of Ni or an Ni alloy.

As described in another claim, the present invention provides a fuel cell stack configured such that a plurality of the fuel cells according to any one of the aforementioned claims are stacked and fixed together by the tightening member.

Effects of the Invention

According to the fuel cell described in the aforementioned claim, since the spacer restrains deformation of the connector contact portion and the cell contact portion in a direction opposite contact, the connector contact portion and the cell contact portion are unlikely to undergo plastic deformation and are unlikely to be affected by deterioration in strength caused by high-temperature heat generated in the course of generating electricity or by creep deformation. Also, since the spacer intervenes between the connector contact portion and the cell contact portion of the current-collecting member and prevents contact therebetween, there is no risk of the connector contact portion and the cell contact portion joining through sintering as a result of exposure to high-temperature heat generated in the course of generating electricity. Therefore, there can be prevented integration of the connector contact portion and the cell contact portion and associated instability of electrical connection. Furthermore, since the fuel cell of the present invention is configured such that the end of the spacer protrudes from at least one of the end of the cell contact portion located opposite the connection portion and the end of the connector contact portion located opposite the connection portion, contact pressure can be effectively applied to at least the one of the cell and connector contact portions up to its end. Thus, since a wide electrical contact area can be secured, even in use over a long period of time, good electrical connection can be maintained.

Furthermore, according to the fuel cell described in the claim, since both of the cell contact portion and the connector contact portion do not protrude from the spacer, the ends of the cell contact portion and the connector portion are less deformed and are thus free from curly deformation. Thus, seizure between the cell contact portion and the connector contact portion can be effectively prevented.

Furthermore, according to the fuel cell described in the claim, since a contact region between the spacer and the cell contact portion, a contact region between the spacer and the connector contact portion, and a contact region between the opposite electrode layer and the current-collecting member corresponding to the opposite electrode layer are aligned with one another, contact pressure is efficiently applied to the contact regions while a harmful planar bending moment, which is a potential cause of breakage of the single cell, is hardly applied to the contact regions.

Also, according to the fuel cell described in the claim, since the spacer covers the entire contact region between the cell contact portion and the electrode layer, appropriate contact pressure can be applied to the entire contact region.

Also, by means of the spacer being formed of a material described in the claim, appropriate contact pressure can be continuously applied to the current-collecting members even in a high-temperature environment in the course of generating electricity.

Also, according to the fuel cell described in the claim, the interconnectors, the single cell, and the current-collecting members are stacked and tightened together with the tightening member, whereby, with the spacer functioning as a core, the cell contact portion of the current-collecting member is reliably in contact with the electrode layer, and the connector contact portion of the current-collecting member is reliably in contact with the interconnector; therefore, electrical connection established by the current-collecting members is stabilized.

Also, according to the fuel cell described in the claim, the spacer is higher in thermal expansion coefficient than is the tightening member; thus, even though the tightening member thermally expands through exposure to heat in the course of generating electricity, causing deterioration in tightening force of tightening together the interconnectors, the single cell, and the current-collecting members, since the spacer thermally expands more than do the tightening members, an action of pressing against the current-collecting members is maintained.

Also, by means of the current-collecting members being formed of a porous metal, a metal mesh, wire, or a punched metal as described in the claim, diffusivity of fuel gas and oxidizer gas is improved as compared with the case of the current-collecting members being formed of a simple plate material.

Also, in the case of the cell contact portion being joined to the surface of the electrode layer of the single cell as described in the claim, since the cell contact portion unitarily follows deformation of the single cell resulting from temperature cycles and fluctuations in fuel pressure and air pressure, stable electrical connection is established.

Also, by means of the connector contact portion of the current-collecting member being joined to the interconnector as described in the claim, even though the single cell is deformed as a result of temperature cycles and fluctuations in fuel pressure and air pressure, electrical connection can be stably maintained between the connector contact portion and the interconnector.

Also, by means of the current-collecting member being disposed between the anode layer and the interconnector and being formed of Ni or an Ni alloy as described in the claim, the cell contact portion and the connector contact portion of the current-collecting member can be joined to the anode layer and the interconnector, respectively, merely through application of heat after the fuel cell is assembled.

Specifically, in view of material properties, Ni or an Ni alloy is excellent in joining to the anode layer and to the interconnector; furthermore, the cell contact portion and the connector contact portion of the current-collecting member are reliably in contact with the single cell and the interconnector, respectively, by virtue of the spacer's pressing; thus, through application of heat after completion of assembly, the cell contact portion is diffusion-bonded to Ni contained in the anode layer of the single cell, and the connector contact portion is diffusion-bonded to the interconnector, whereby these members are integrated together. In this manner, when the cell contact portion and the connector contact portion are integrated with the single cell and the interconnector, respectively, through bonding, electrical connection is stabilized between the cell body and the interconnector.

Since the temperature of the fuel cell reaches around 700° C. to 1,000° C., the cell contact portion and the connector contact portion can be joined to the anode layer and the interconnector, respectively, with heat generated in the course of generating electricity. Therefore, a step of applying heat can be eliminated, whereby energy can be saved.

Also, since the fuel cell stack described in the claim is configured such that a plurality of the fuel cells according to any one of the aforementioned claims are stacked and fixed together by the tightening member, good electrical connection can be maintained in use over a long period of time.

MODES FOR CARRYING OUT THE INVENTION

At present, fuel cells are roughly classified into four types according to materials for electrolyte; specifically, a polymer electrolyte fuel cell (PEFC) which uses a polymer electrolyte membrane as electrolyte, a phosphoric-acid fuel cell (PAFC) which uses phosphoric acid as electrolyte, a molten carbonate fuel cell (MCFC) which uses Li—Na/K carbonate as electrolyte, and a solid oxide fuel cell (SOFC) which uses, for example, $ZrO_2$ ceramic as electrolyte. These types differ in working temperature (temperature at which ions can move through electrolyte); at present, working temperatures are as follows: room temperature to about 90° C. for PEFC, about 150° C. to 200° C. for PAFC, about 650° C. to 700° C. for MCFC, and about 700° C. to 1,000° C. for SOFC.

Figure 1:
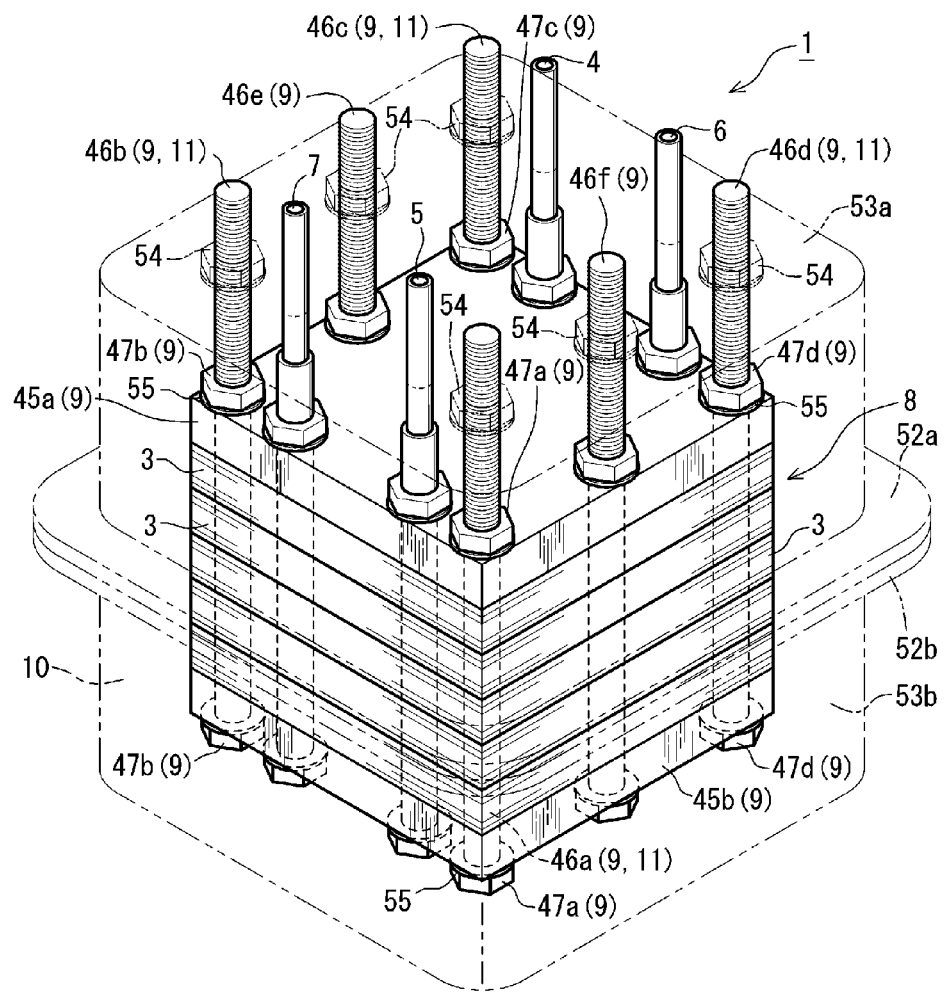
FIG. 1 Perspective view of fuel cell apparatus.
Figure 2:
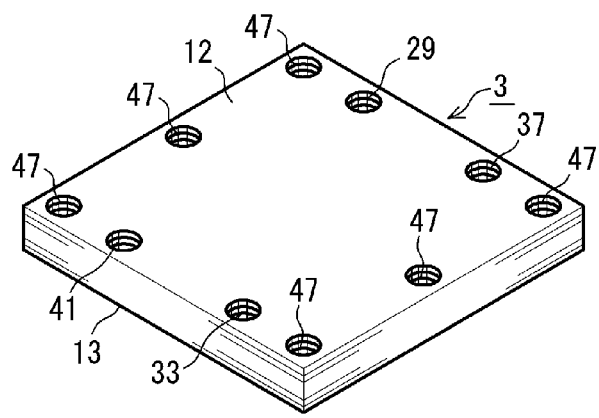
FIG. 2 Perspective view of a fuel cell.

As shown in FIG. 1, a fuel cell apparatus 1 according to an embodiment of the present invention is an SOFC apparatus which uses, for example, $ZrO_2$ ceramic as an electrolyte layer 2. The fuel cell apparatus 1 includes fuel cells 3, each of which is a minimum unit for generating electricity; an air supply channel 4 for supplying air to the fuel cells 3; an air discharge channel 5 for discharging air from the apparatus; a fuel supply channel 6 for supplying fuel gas to the fuel cells 3; a fuel discharge channel 7 for discharging fuel gas from the apparatus; a fixing member 9 for fixing a stack of the fuel cells 3, or a group of cells, to thereby form a fuel cell stack 8; a container 10 which contains the fuel cell stack 8; and output members 11 for outputting electricity generated in the fuel cell stack 8.

[Fuel Cell]

Figure 3:
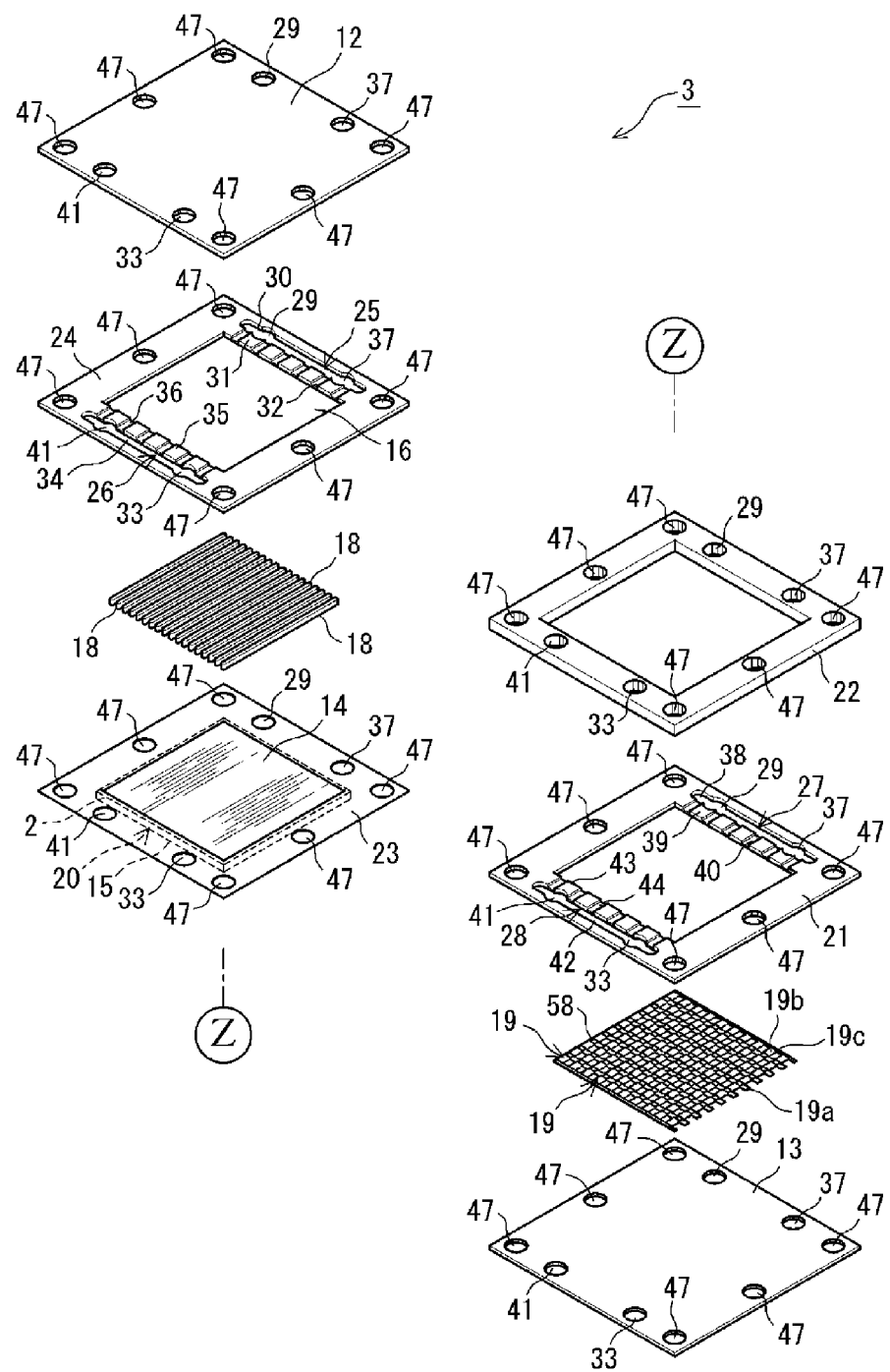
FIG. 3 Exploded perspective view of the fuel cell.
Figure 4:
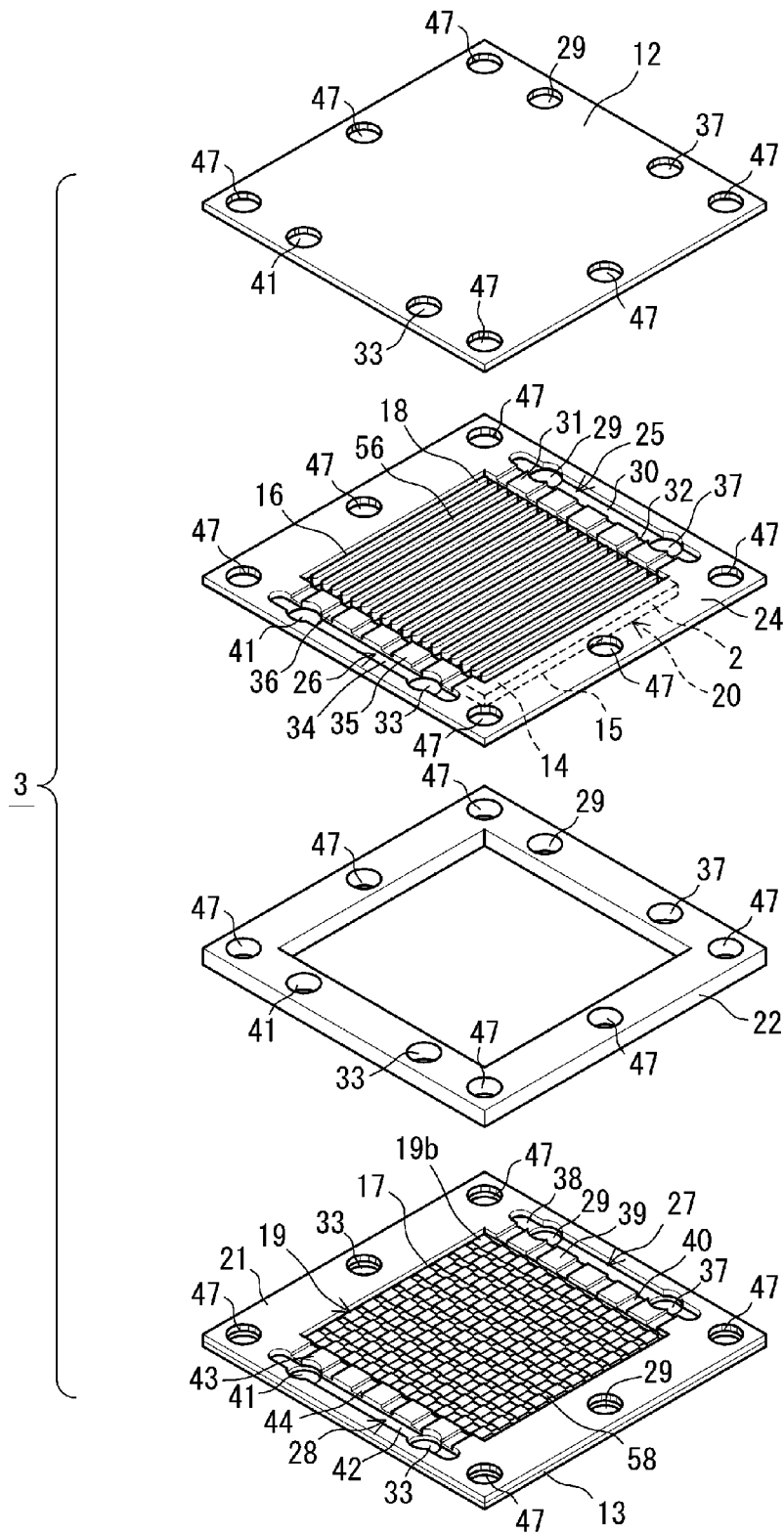
FIG. 4 Exploded perspective view of the fuel cell showing limited components thereof.

The fuel cell 3 has a square shape as viewed in plane; as shown in the exploded perspective views of FIGS. 3 and 4, the fuel cell 3 is formed by stacking an upper (* herein, the terms "upper" and "lower" are based on illustration on drawings and used for convenience of description and do not necessarily mean absolute vertical upper and lower, and the same also applies in the following description) interconnector 12 formed of an electrically conductive square plate of ferritic stainless steel or the like; a lower interconnector 13 formed of an electrically conductive square plate of ferritic stainless steel or the like; a single cell 20 located at a substantially middle position between the upper and lower interconnectors 12 and 13 while being spaced from the interconnectors 12 and 13, and having an electrode layer (hereinafter, called the "cathode layer") 14 formed on a surface of an electrolyte layer 2 opposite the inner surface (lower surface) of the upper interconnector 12 and the other electrode layer (hereinafter, called the "anode layer") 15 formed on a surface of the electrolyte layer 2 opposite the inner surface (upper surface) of the lower interconnector 13; an air chamber 16 formed between the upper interconnector 12 and the cathode layer 14; a fuel chamber 17 formed between the lower interconnector 13 and the anode layer 15; current-collecting members 18 on the cathode layer 14 side disposed in the air chamber 16 and electrically connecting the cathode layer 14 and the upper interconnector 12; and current-collecting members 19 on the anode layer 15 side disposed in the fuel chamber 17 and electrically connecting the anode layer 15 and the lower interconnector 13; and the fuel cell 3 has tightening through holes 47 extending therethrough and formed at corners of the square shape and at middle positions of two opposite sides of the square shape for allowing tightening members 46a to 46f, which will be described later, of the fixing member 9 to be inserted through the tightening through holes 47.

[Electrolyte Layer]

In addition to $ZrO_2$ ceramic, materials used to form the electrolyte layer 2 include $LaGaO_3$ ceramic, $BaCeO_3$ ceramic, $SrCeO_3$ ceramic, $SrZrO_3$ ceramic, and $CaZrO_3$ ceramic.

[Anode Layer]

An example material for the anode layer 15 is a mixture of metal such as Ni or Fe and at least one of ceramics such as $ZrO_2$ ceramics, such as zirconia stabilized with at least one of rare earth elements such as Sc and Y, and $CeO_2$ ceramics. Also, material for the anode layer 15 may be metal such as Pt, Au, Ag, Pb, Ir, Ru, Rh, Ni, or Fe, and these metals may be used singly or in the form of an alloy of two or more of them. Furthermore, another example material for the anode layer 15 is a mixture (including cermet) of one or more of these metals and/or an alloy of these metals and at least one of the above-mentioned ceramics. A further example material for the anode layer 15 is a mixture of an oxide of metal such as Ni or Fe and at least one of the above-mentioned ceramics.

[Cathode Layer]

Example materials for the cathode layer 14 include various metals, oxides of metals, and complex oxides of metals. Examples of the metals include Pt, Au, Ag, Pb, Ir, Ru, and Rh, and alloys which contain two or more of the metals. Furthermore, examples of the oxides of metals include oxides of La, Sr, Ce, Co, Mn, and Fe ($La_2O_3$, SrO, $Ce_2O_3$, $Co_2O_3$, $MnO_2$, and FeO). Examples of the complex oxides of metals include complex oxides which contain at least La, Pr, Sm, Sr, Ba, Co, Fe, or Mn ($La_{1-x}Sr_xCoO_3$ complex oxide, $La_{1-x}Sr_xFeO_3$ complex oxide, $La_{1-x}Sr_xCo_{1-y}FeO_3$ complex oxide, $La_{1-x}Sr_xMnO_3$ complex oxide, $Pr_{1-x}Ba_xCoO_3$ complex oxide, and $Sm_{1-x}Sr_xCoO_3$ complex oxide).

[Fuel Chamber]

As shown in FIGS. 3 to 6, the fuel chamber 17 assumes the form of a square chamber defined by an anode gas channel forming insulating frame (hereinafter, may be called the "anode insulating frame") 21 having the form of a picture frame and disposed on the upper surface of the lower interconnector 13 while surrounding the current-collecting members 19, and an anode frame 22 having the form of a picture frame and disposed on the upper surface of the anode insulating frame 21.

[Current-Collecting Members in Fuel Chamber]

Figure 5:
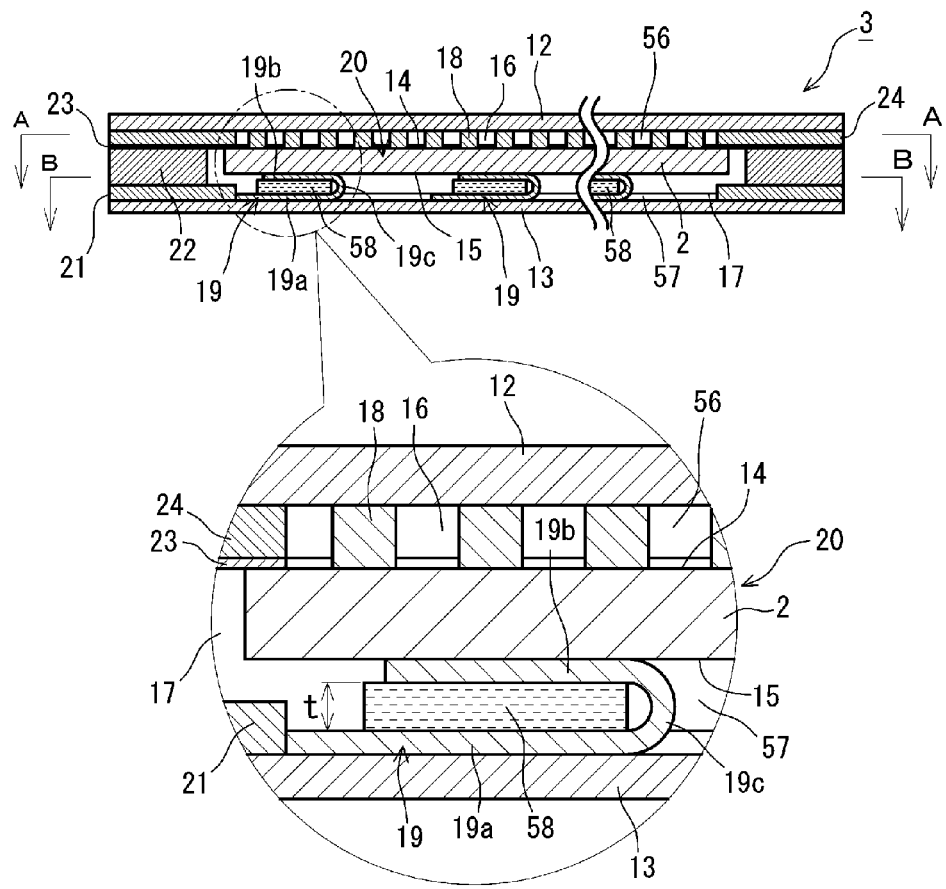
FIG. 5 Longitudinal sectional view showing the fuel cell with its laterally intermediate portion omitted.
Figure 6:
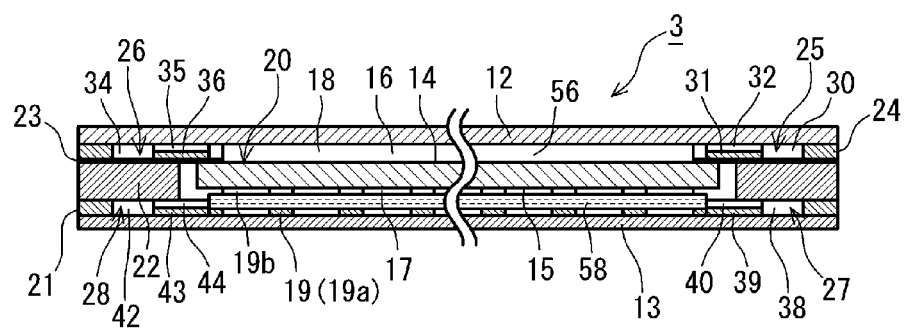
FIG. 6 Longitudinal sectional view taken orthogonally to FIG. 5.

As shown in FIG. 5, the current-collecting members 19 in the fuel chamber 17 are formed of, for example, Ni and are each configured such that there are integrally formed a connector contact portion 19a in contact with the lower interconnector 13, a cell contact portion 19b in contact with the anode layer 15 of the single cell 20, and a connection portion 19c connecting the connector contact portion 19a and the cell contact portion 19b and bent by about 180 degrees to have a shape resembling the letter U. The current-collecting members 19 of the embodiment are formed of, for example, a foil having a thickness of about 30 μm; accordingly, the connection portion 19c can be bent and unbent in a direction intersecting with a plane, and is very small in elastically repulsive force against bending and unbending.

The current-collecting members 19 in the fuel chamber 17 may be formed of, for example, a porous metal of Ni, a metal mesh of Ni, wire of Ni, or a punched metal of Ni, in addition to the above-mentioned method of formation. Also, the current-collecting members 19 in the fuel chamber 17 may be formed of metal resistant to oxidation, such as an Ni alloy or stainless steel, in addition to Ni.

Figure 9:
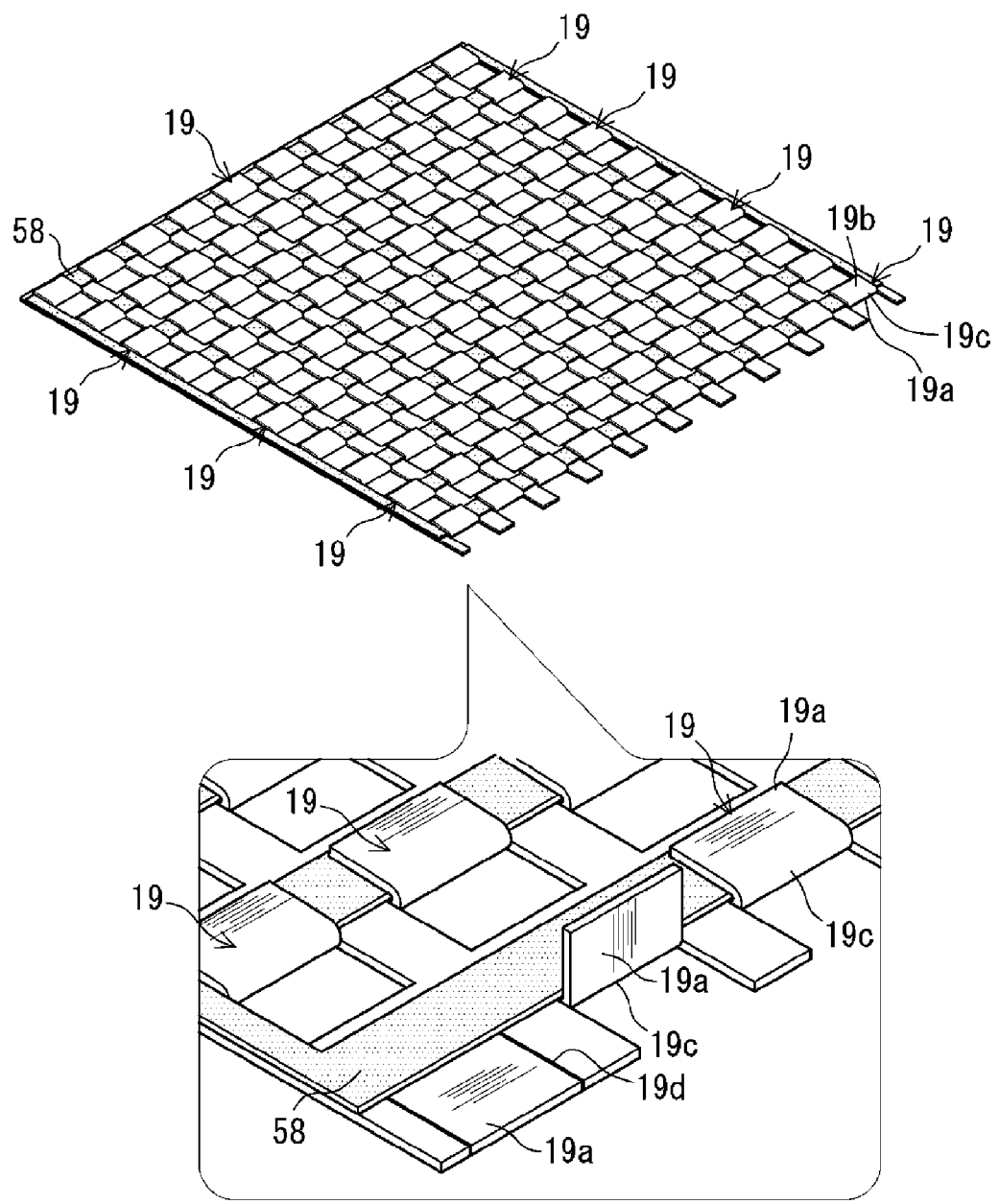
FIG. 9 Perspective view of current-collecting members.
Figure 10:
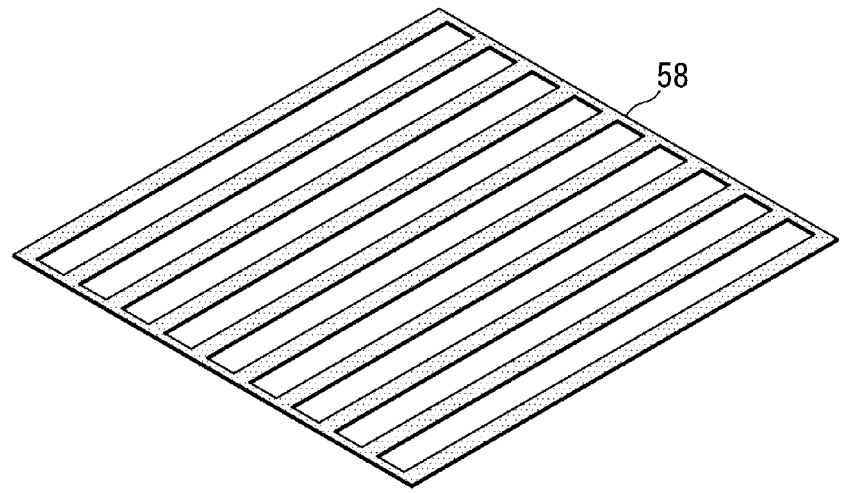
FIG. 10(*a*) is a perspective view of a spacer, and FIG. 10(*b*) is a perspective view of a sheet of the current-collecting members to be assembled to the spacer.
Figure 10:
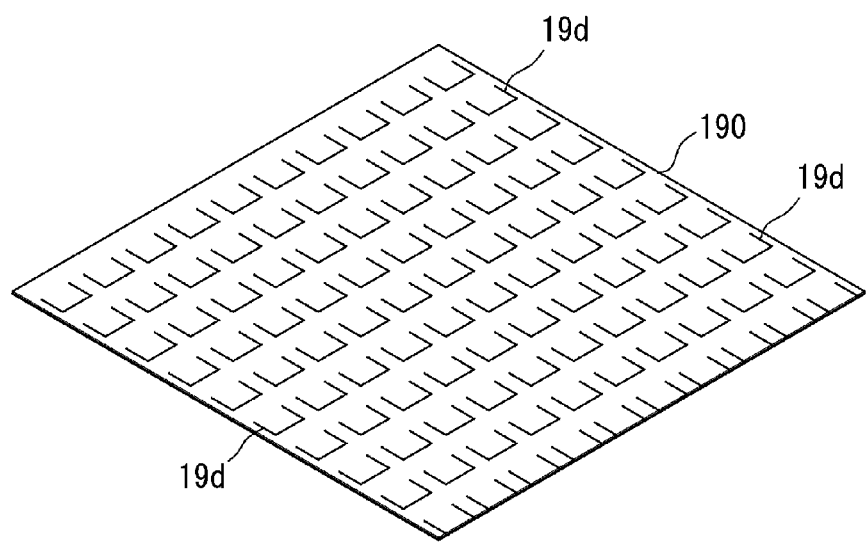
Figure 10:
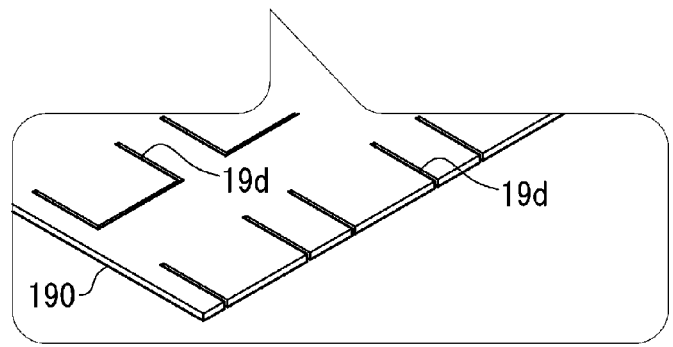

The current-collecting members 19 are provided in a quantity of about several tens to one hundred (of course, depending on the size of the fuel chamber); the current-collecting members 19 may be individually arrayed on and welded (e.g., laser-welded or resistance-welded) to the interconnector 13; preferably, as shown in FIG. 10(b), the aforementioned foil is formed into a square flat sheet 190 compatible with the fuel chamber 17; cuts 19d corresponding to the cell contact portions 19b and the connection portions 19c are made in the flat sheet 190; then, as shown in the enlarged view in FIG. 9, the connection portions 19c are bent into a shape resembling the letter U such that the cell contact portions 19b face the corresponding connector contact portions 19a from above with a gap t (see the enlarged view in FIG. 5) therebetween. Thus, the flat sheet 190 having holes formed as a result of the cell contact portions 19b being raised and bent is an aggregate of the connector contact portions 19a; in the embodiment, the connector contact portions 19a of the flat sheet 190 are joined to the lower interconnector 13 through laser welding or resistance welding.

In the above case, welding is employed as a joining method; however, the present invention is not limited thereto. Heat generated as a result of operation of the fuel cell apparatus may be utilized for joining the connector contact portions 19a to the lower interconnector 13.

Figure 11:
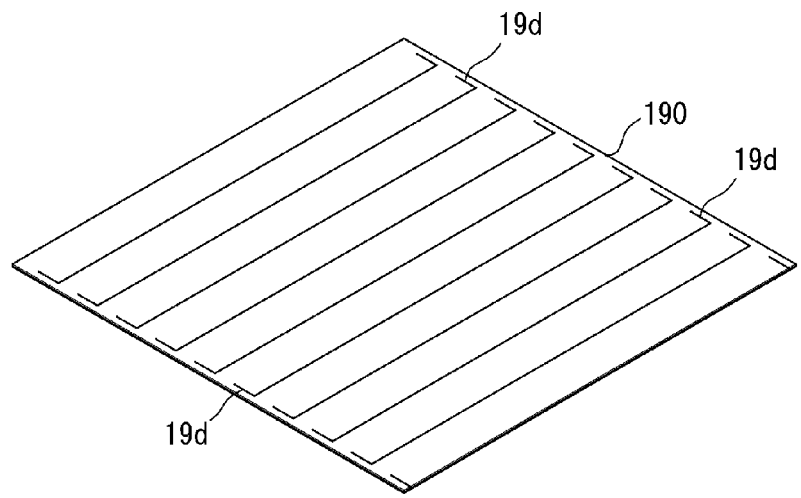
FIG. 11 Perspective view showing a modified sheet of the current-collecting members of FIG. 10(*b*).

As shown in FIG. 11, the cuts 19d for the current-collecting members 19 may be made in such a manner that the cell contact portions 19b and the connection portions 19c are integrated in row units. This allows the cell contact portions 19b and the connection portions 19c to be efficiently formed.

[Spacer]

As shown in FIG. 5, the spacer 58 is incorporated in the current-collecting members 19. The spacer 58 is disposed between the connector contact portions 19a and the cell contact portions 19b in such a manner as to separate the connector contact portions 19a from the cell contact portions 19b in the fuel chamber 17 located between the single cell 20 and the lower interconnector 13; in order for the spacer 58 to elastically press the cell contact portions 19b and the connector contact portions 19a in their contact directions; i.e., to elastically press the cell contact portions 19b toward the single cell 20, and the connector contact portions 19a toward the interconnector 13, by means of thermal expansion of the spacer 58 in its thickness direction at least in a working temperature range of the fuel cell apparatus, the thickness and material of the spacer 58 are determined such that, at a working temperature of the fuel cell apparatus of 700° C. to 1,000° C., thermal expansion of the spacer 58 is greater than that of the gap t.

The thickness of the spacer 58 may be determined so as to be, in a working temperature range of the fuel cell apparatus, greater than the gap t between the cell contact portions 19b and the connector contact portion 19a, but is preferably substantially equal to or slightly greater than at least the gap t between the cell contact portions 19b and the connector contact portions 19a at room temperature in an inactive condition of the fuel cell apparatus. Employment of such a thickness enables the spacer 58 to provide stable electrical contact between the connector contact portions 19a and the interconnector 13 and between the cell contact portions 19b and the single cell 20 even until the working temperature range is reached from start of generation of electricity.

Material of the spacer 58 is more flexible in the thickness direction than the current-collecting members 19, and the spacer 58 expands and contracts in response to fluctuations in the gap of the fuel chamber 17 caused by temperature cycles and variations of fuel pressure and air pressure. Specifically, in response to contraction of the gap of the fuel chamber 17, the spacer 58 contracts in the thickness direction to exhibit a cushioning action, thereby preventing cracking of the single cell 20, whereas, in response to expansion of the gap, the spacer 58 stabilizes electrical contact through resilience in the thickness direction.

Also, as shown in FIG. 5, the spacer 58 has such a length that one end thereof is located at a substantially deepest position in the connection portion 19c of the current-collecting member 19, and the other end thereof protrudes from an end of the cell contact portion 19b located opposite the connection portion 19c. Thus, as viewed in plane, the region (length) of the spacer 58 encompasses the entire region where the cell contact portion 19b and the anode layer 15 are in contact with each other (a region which extends from near the boundary between the cell contact portion 19b and the connection portion 19c to the end of the cell contact portion 19b located opposite the connection portion 19c and in which the cell contact portion 19b and the anode layer 15 are actually in contact with each other). Thus, an action of the spacer 58 is uniformly applied to the above-mentioned region of the cell contact portion 19b.

Meanwhile, as shown in FIG. 5, the end of the spacer 58 located opposite the connection portion 19c of the current-collecting member 19 recedes from the corresponding end of the connector contact portion 19a. Thus, an action of the spacer 58 is uniformly applied to the connector contact portion 19a through the entire surface of the spacer 58.

The spacer 58 is formed of a material which is not sintered to the current-collecting member 19 in the working temperature range of the fuel cell apparatus; therefore, the cell contact portion 19b and the connector contact portion 19a are unlikely to be sintered to each other through direct contact. Also, the cell contact portion 19b and the connector contact portion 19a are unlikely to be sintered to each other through the spacer 58.

As a material for the spacer 58 which satisfies the above conditions, there may be used singly or in combination mica, alumina felt, vermiculite, carbon fiber, silicon carbide fiber, and silica. Through impartation of, for example, a sheet-like laminate structure as in the case of mica to these materials, the materials exhibit appropriate elasticity in response to load applied in the direction of lamination. The thermal expansion coefficient in the thickness direction (direction of lamination) of the spacer 58 formed of these materials is higher than the thermal expansion coefficient in the axial direction of the tightening members 46a to 46f, which will be described later.

The current-collecting members 19 of the embodiment are integrated into a unitary structure implemented through the flat sheet 190, which is an aggregate of the connector contact portions 19a as mentioned above; as shown in FIG. 10(a), in order for the spacer 58 to be compatible with the structure, the spacer 58 is formed into a horizontal grating form such that, from a single rectangular material sheet which has substantially the same width as that of the flat sheet 190 and is slightly shorter than the flat sheet 190 (specifically, shorter by the total length of the cell contact portion 19b and the connection portion 19c), portions of the material sheet each corresponding to the cell contact portions 19b and the connection portions 19c arrayed in a row are cut out.

Then, the spacer 58 is placed on the flat sheet 190 which is shown in FIG. 10(b) and is to be formed into the current-collecting members 19; in this condition, as shown in the enlarged view of FIG. 9, the connection portions 19c are bent by about 180 degrees into a shape resembling the letter U, thereby forming the current-collecting members 19 with the spacer 58 incorporated therein.

Incidentally, in the enlarged view of FIG. 9, the cell contact portions 19b are formed through bending performed sequentially in the rightward direction from the cell contact portion 19b located at the left corner position; however, this illustration is intended primarily to explain a working procedure; thus, the cell contact portions 19b may be formed in unison through bending or may be formed sequentially from the cell contact portion 19b located at a position convenient for working.

[Air Chamber]

As shown in FIGS. 3 to 6, the air chamber 16 assumes the form of a square chamber defined by an electrically conductive, thin metal separator 23 having the form of a square picture frame and having the electrolyte layer 2 affixed to the lower surface thereof, and a cathode gas channel forming insulating frame (hereinafter, may be called the "cathode insulating frame") 24 having the form of a picture frame and disposed between the separator 23 and the upper interconnector 12 while surrounding the current-collecting members 18.

[Current-Collecting Members in Air Chamber]

The current-collecting members 18 in the air chamber 16 are dense electrically conductive members each having the form of a slender square bar and formed of, for example, stainless steel and are disposed in parallel with one another at fixed intervals while being in contact with the cathode layer 14 on the upper surface of the electrolyte layer 2 and the lower surface (inner surface) of the upper interconnector 12.

As shown in FIG. 5, as viewed in plane, at least portions of the current-collecting members 18 in the air chamber 16 are in contact with the cathode layer 14 in a region where the spacer 58 is in contact with the cell contact portions 19b and with the connector contact portions 19a. Thus, contact regions between the spacer 58 and the cell contact portions 19b, contact regions between the spacer 58 and the connector contact portions 19a, and contact regions between the cathode layer 14 and the current-collecting members 18 are aligned with one another; therefore, contact pressure can be efficiently applied to the contact regions while a harmful planar bending moment, which is a potential cause of breakage of the single cell 20, is hardly applied to the contact regions.

As described above, the fuel cell 3 forms the fuel chamber 17 and the air chamber 16 through cooperation with the lower interconnector 13, the anode insulating frame 21, the anode frame 22, the separator 23, the cathode insulating frame 24, and the upper interconnector 12. Also, the electrolyte layer 2 partitions the fuel cell 3 into the fuel chamber 17 and the air chamber 16 independently of each other, and the anode insulating frame 21 and the cathode insulating frame 24 electrically insulate the anode layer 15 side and the cathode layer 14 side from each other.

Also, the fuel cell 3 includes an air supply section 25 including the air supply channel 4 for supplying air into the air chamber 16, an air discharge section 26 including the air discharge channel 5 for discharging air from the air chamber 16 to an external system, a fuel supply section 27 including the fuel supply channel 6 for supplying fuel gas into the fuel chamber 17, and a fuel discharge section 28 including the fuel discharge channel 7 for discharging fuel gas from the fuel chamber 17 to an external system.

[Air Supply Section]

Figure 7:
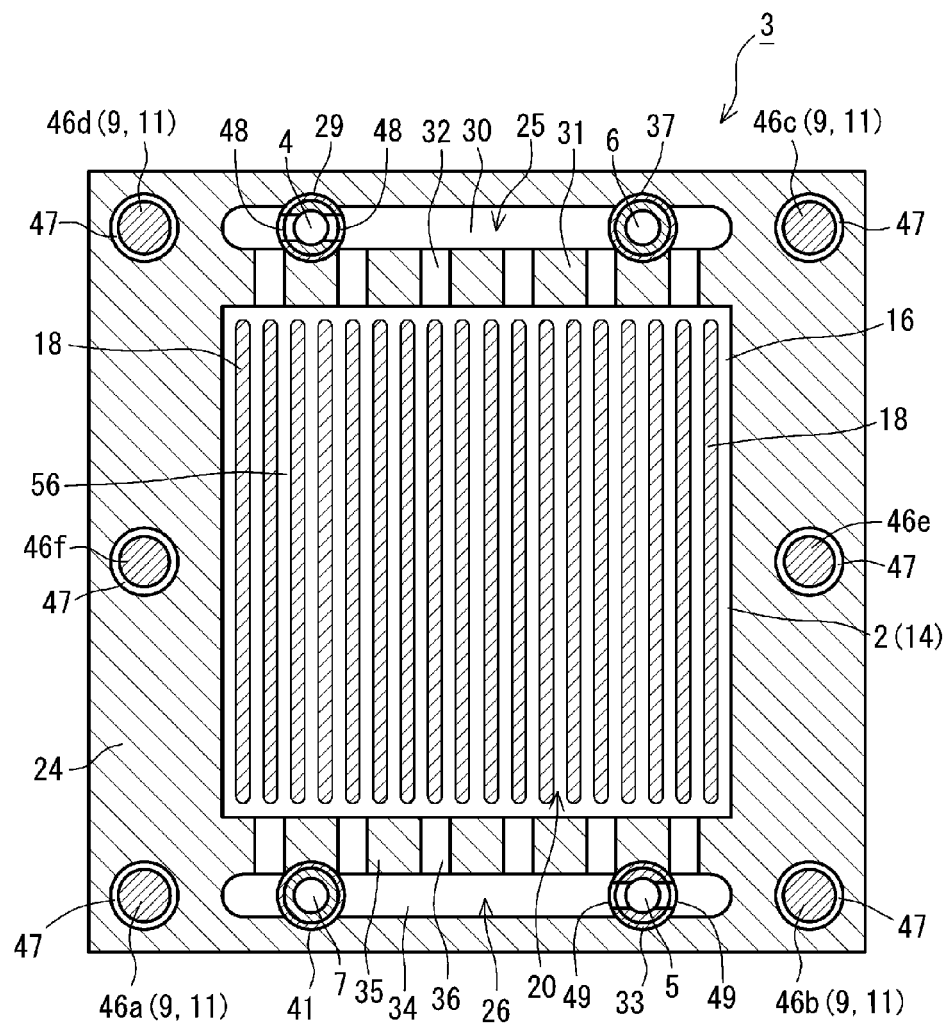
FIG. 7 Sectional view taken along line A-A of FIG. 5.

As shown in FIG. 7, the air supply section 25 includes an air supply through hole 29 extending in the vertical direction at a position located toward a corner and one side of the square fuel cell apparatus 1, an elongated-hole-like air supply manifold 30 formed in the cathode insulating frame 24 and communicating with the air supply through hole 29, a plurality of air supply communication channels 32 formed at equal intervals on the upper surface of a partition wall 31 which separates the air supply manifold 30 and the air chamber 16 from each other, by sinking corresponding portions of the upper surface, and the air supply channel 4 inserted through the air supply through hole 29 and adapted to supply air to the air supply manifold 30 from an external system.

[Air Discharge Section]

The air discharge section 26 includes an air discharge through hole 33 extending in the vertical direction at a position located toward a corner and one side opposite the air supply section 25 of the fuel cell apparatus 1, an elongated-hole-like air discharge manifold 34 formed in the cathode insulating frame 24 and communicating with the air discharge through hole 33, a plurality of air discharge communication channels 36 formed at equal intervals on the upper surface of a partition wall 35 which separates the air discharge manifold 34 and the air chamber 16 from each other, by sinking corresponding portions of the upper surface, and the tubular air discharge channel 5 inserted through the air discharge through hole 33 and adapted to discharge air from the air discharge manifold 34 to an external system.

[Fuel Supply Section]

Figure 8:
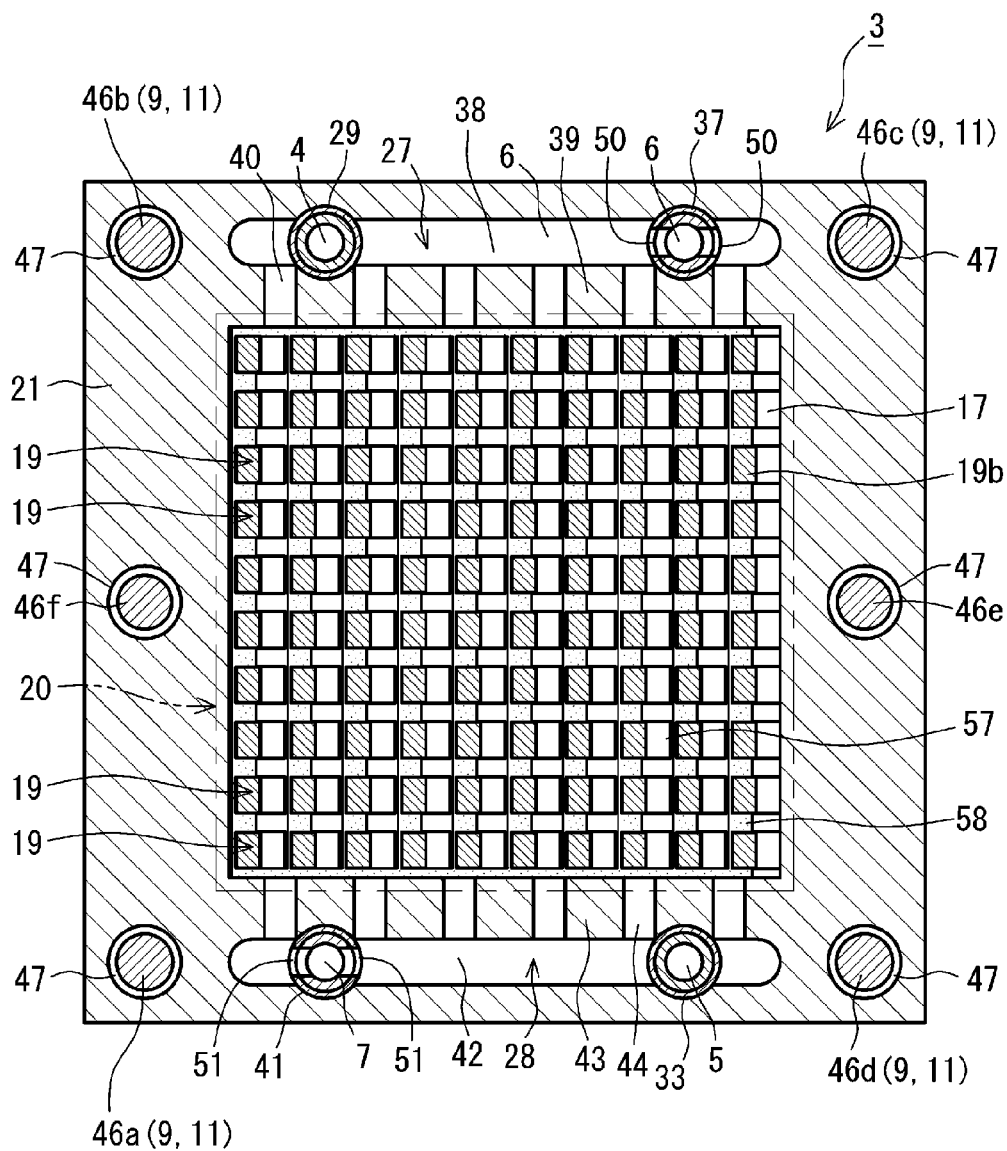
FIG. 8 Sectional view taken along line B-B of FIG. 5.

As shown in FIG. 8, the fuel supply section 27 includes a fuel supply through hole 37 extending in the vertical direction at a position located toward a corner opposite the air supply through hole 29 and the same one side as that of the air supply section 25 of the square fuel cell apparatus 1, an elongated-hole-like fuel supply manifold 38 formed in the anode insulating frame 21 and communicating with the fuel supply through hole 37, a plurality of fuel supply communication channels 40 formed at equal intervals on the upper surface of a partition wall 39 which separates the fuel supply manifold 38 and the fuel chamber 17 from each other, by sinking corresponding portions of the upper surface, and the tubular fuel supply channel 6 inserted through the fuel supply through hole 37 and adapted to supply fuel to the fuel supply manifold 38 from an external system.

[Fuel Discharge Section]

The fuel discharge section 28 includes a fuel discharge through hole 41 extending in the vertical direction at a position located toward a corner and one side opposite the fuel supply section 27 of the fuel cell apparatus 1, an elongated-hole-like fuel discharge manifold 42 formed in the anode insulating frame 21 and communicating with the fuel discharge through hole 41, a plurality of fuel discharge communication channels 44 formed at equal intervals on the upper surface of a partition wall 43 which separates the fuel discharge manifold 42 and the fuel chamber 17 from each other, by sinking corresponding portions of the upper surface, and the tubular fuel discharge channel 7 inserted through the fuel discharge through hole 41 and adapted to discharge fuel gas from the fuel discharge manifold 42 to an external system.

[Fuel Cell Stack]

As shown in FIG. 1, the fuel cell stack 8 is configured such that a plurality of the fuel cells 3 are stacked into a group of cells, and the group of cells is fixed with the fixing member 9. In the case of stacking a plurality of the fuel cells 3, two adjacent fuel cells 3 share one interconnector which serves as the upper interconnector 12 of the lower fuel cell 3 and as the lower interconnector 13 of the upper fuel cell 3.

The fixing member 9 is a set consisting of a pair of end plates 45a and 45b for vertically clamping the fuel cell stack 8, and six sets of tightening members 46a to 46f for clamping the end plates 45a and 45b and the fuel cell stack 8 by fixing bolts, with nuts, inserted through tightening holes (not shown) of the end plates 45a and 45b and through the tightening through holes 47 of the fuel cell stack 8. Material for the tightening members 46a to 46f is, for example, INCONEL 601.

The air supply channel 4 is mounted to the fuel cell stack 8 of the fuel cell apparatus 1 in such a manner as to vertically extend through the through holes (not shown) of the end plates 45a and 45b and through the air supply through hole 29. An end of the tubular channel is closed, and, as shown in FIG. 7, the tubular channel has horizontal holes 48 corresponding to the air supply manifolds 30, whereby air is supplied to the air supply manifolds 30 through the horizontal holes 48.

Similarly, the air discharge channel 5 receives air discharged from the air discharge manifolds 34 through corresponding horizontal holes 49 thereof and discharges air to an external system; as shown in FIG. 8, the fuel supply channel 6 supplies fuel gas to the fuel supply manifolds 38 through corresponding horizontal holes 50 thereof; and the fuel discharge channel 7 receives fuel gas discharged from the fuel discharge manifolds 42 through corresponding horizontal holes 51 thereof and discharges fuel gas to an external system.

[Container]

The container 10 for containing the fuel cell stack 8 is a heat-resistant closed structure and is, as shown in FIG. 1, configured such that two half containers 53a and 53b having flanges 52a and 52b, respectively, at their opening portions, face each other and are joined together. The bolts of the tightening members 46a to 46f protrude from the top of the container 10, and nuts 54 are threadingly engaged with protruding portions of the tightening members 46a to 46f, respectively, thereby fixing the fuel cell stack 8 within the container 10. Also, the air supply channel 4, the air discharge channel 5, the fuel supply channel 6, and the fuel discharge channel 7 protrude from the top of the container 10, and, to protruding portions thereof, air and fuel gas supply sources, etc., are connected.

[Output Members]

The output members 11 for outputting electricity generated in the fuel cell apparatus 1 are the tightening members 46a to 46d located at corners of the fuel cell stack 8, and the end plates 45a and 45b. Specifically, a pair of the tightening members 46a and 46c located diagonally are electrically connected to the upper end plate 45a, which functions as a positive pole, and the other pair of the tightening members 46b and 46d are electrically connected to the lower end plate 45b, which functions as a negative pole. Of course, the tightening members 46a and 46c connected to a positive pole and the tightening members 46b and 46d connected to a negative pole are electrically insulated from the end plates 45b and 45a, respectively, of opposite polarities by means of intervention of the insulating washer 55 (see FIG. 1), and from the fuel cell stack 8 by means of provision of gaps in relation to walls of the tightening through holes 47. Thus, the tightening members 46a and 46c of the fixing member 9 function as output terminals of positive polarity connected to the upper end plate 45a, and the other tightening members 46b and 46d function as output terminals of negative polarity connected to the lower end plate 45b.

[Generation of Electricity]

Air supplied to the air supply channel 4 of the fuel cell apparatus 1 flows downward in FIG. 7; specifically, is supplied into the air chamber 16 through the air supply section 25 composed of the upper air supply channel 4, the air supply manifold 30, and the air supply communication channels 32; passes through gas flow channels 56 formed between the current-collecting members 18 in the air chamber 16; and is then discharged to an external system through the air discharge section 26 composed of air discharge communication channels 36, the air discharge manifold 34, and the air discharge channel 5.

At the same time, fuel gas; for example, hydrogen, supplied to the fuel supply channel 6 of the fuel cell apparatus 1 flows downward in FIG. 8; specifically, is supplied into the fuel chamber 17 through the fuel supply section 27 composed of the upper fuel supply channel 6, the fuel supply manifold 38, and the fuel supply communication channels 40; diffuses and passes through gas flow channels 57 of the current-collecting members 19 in the fuel chamber 17; and is then discharged to an external system through the fuel discharge section 28 composed of the fuel discharge communication channels 44, the fuel discharge manifold 42, and the fuel discharge channel 7.

While air and fuel gas are being supplied and discharged as mentioned above, the temperature in the container 10 is increased to 700° C. to 1,000° C., whereby air and fuel gas react with each other through the cathode 14, the electrolyte layer 2, and the anode 15; thus, electric energy of direct current is generated with the cathode 14 functioning as a positive pole and the anode 15 functioning as a negative pole. Since the principle of generation of electric energy in the fuel cell 3 is well known, repeated description thereof is omitted.

As mentioned above, the cathode 14 is electrically connected to the upper interconnector 12 through the current-collecting members 18, whereas the anode 15 is electrically connected to the lower interconnector 13 through the current-collecting members 19; since the fuel cell stack 8 is such that a plurality of the fuel cells 3 are stacked and connected in series, the upper end plate 45a functions as a positive pole, whereas the lower end plate 45b functions as a negative pole; and electric energy can be output from the fuel cell apparatus through the tightening members 46a to 46d, which also function as output terminals.

The above-mentioned fuel cell apparatus repeats a temperature cycle such that temperature increases in the course of generating electricity and decreases as a result of suspension of generation of electricity. Therefore, all members which constitute the fuel chamber 17 and the air chamber 16, and the tightening members 46a to 46f repeat thermal expansion and contraction; accordingly, the gaps of the fuel chamber 17 and the air chamber 16 repeat expansion and contraction.

Also, fuel pressure and air pressure may fluctuate, and, as a result of fluctuations in the pressures, the single cell 20 is deformed, whereby the gaps of the fuel chamber 17 and the air chamber 16 expand or contract.

In response to such variations in the expanding direction of the fuel chamber 17 and the air chamber 16, in the embodiment, the current-collecting members 19 in the fuel chamber 17 press the single cell 20 primarily by thermal expansion of the spacer 58 in the same direction as that of elasticity of the spacer 58 in the stacking direction (the thickness direction or the tightening direction of the tightening members 46a to 46f), whereby electrical contact is stably maintained. Since pressing of the current-collecting members 19 against the single cell 20 is transmitted to the air chamber 16 side, electrical contact in the air chamber 16 is also stably maintained.

Also, in response to variations in the contracting direction of the fuel chamber 17 and the air chamber 16, stress applied to the single cell 20 is mitigated primarily by contraction of the spacer 58 in the fuel chamber 17.

Also, when the current-collecting members 19 on the anode layer 15 side are formed of Ni or an Ni alloy, in a high-temperature environment in the course of generating electricity, the cell contact portions 19b are diffusion-bonded to Ni contained in the anode layer 15, thereby being integrated with the anode layer 15. Therefore, electrical connection through the current-collecting members 19 is more stably maintained.

Preferably, NiO paste is applied to the anode layer 15 to form a joining layer. Through formation of such a joining layer, as a result of flow of electric current in $H_2$, NiO becomes Ni, whereby the performance of joining between the current-collecting members 19 and the anode layer 15 is further improved. The joining layer may be formed through application of Pt paste to the anode layer 15.

In embodiment 1, the flat sheet 190, which is an aggregate of the connector contact portions 19a, is welded to the lower interconnector 13; however, the interconnector 13 and the current-collecting members 19 can be joined together in a high-temperature environment in the course of generating electricity, through combination of materials for the lower interconnector 13 and the flat sheet 190 such that the materials can be diffusion-bonded to each other in the high-temperature environment in the course of generating electricity (e.g., combination of Crofer22H and Ni) or through formation of such a joining layer mentioned above on the inner surface of the lower interconnector 13.

The present invention has been described with reference to the embodiment; however, the present invention is not limited thereto. For example, in the embodiment, the current-collecting members 18 in the air chamber 16 and the current-collecting members 19 in the fuel chamber 17 differ in configuration; however, the current-collecting members in the air chamber 16 and the current-collecting members 19 in the fuel chamber 17 may have the same configuration.

Figure 12:
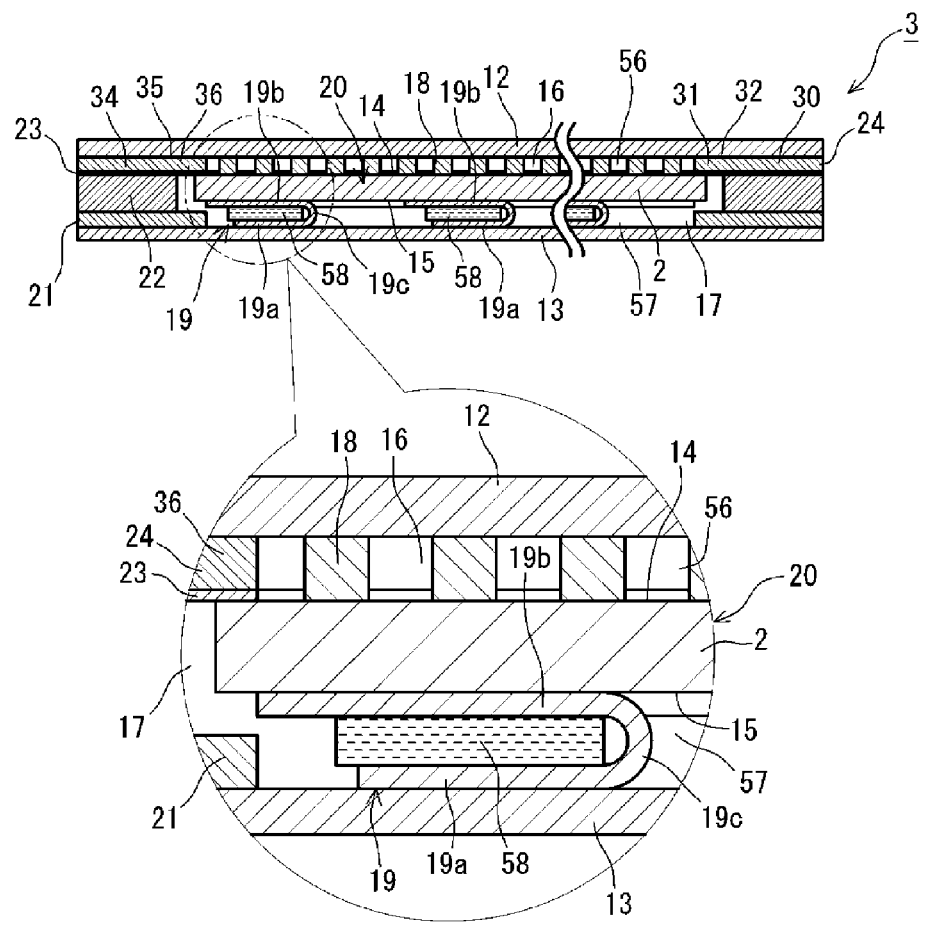
FIG. 12 Longitudinal sectional view of a fuel cell according to another embodiment with its laterally intermediate portion omitted.

Also, the orientation of the current-collecting members 19 in the fuel chamber 17 is not limited to that shown in FIG. 5; for example, the current-collecting members 19 may be inverted upside-down as shown in FIG. 12. In such a case, the flat sheet 190 is an aggregate of the cell contact portions 19b, and the end of the spacer 58 protrudes outward from the end of the connector contact portion 19a located opposite the connection portion, whereas the same end of the spacer 58 recedes inward from the end of the cell contact portion 19b located opposite the connection portion.

Figure 13:
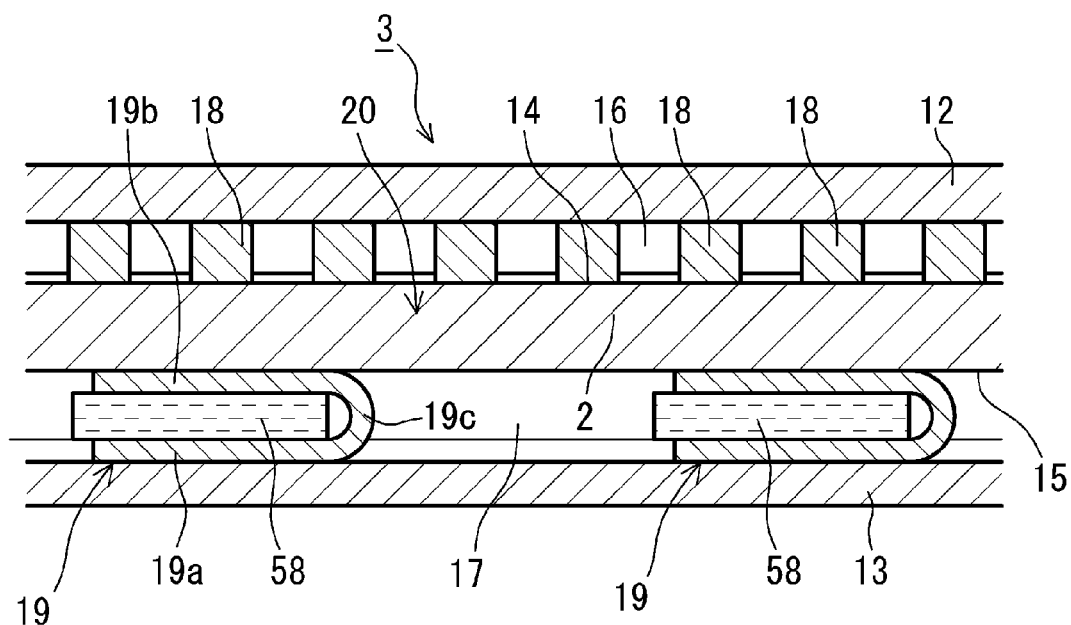
FIG. 13 Longitudinal sectional view of a fuel cell according to a further embodiment.

Also, in the embodiment, the end of the spacer 58 protrudes outward from the end of the connector contact portion 19a or the cell contact portion 19b, whichever is shorter; however, as shown in FIG. 13, the end of the spacer 58 may protrude outward from both of the end of the cell contact portion 19b located opposite the connection portion and the end of the connector contact portion 19a located opposite the connection portion.

Also, in the embodiment, the electrolyte layer 2 assumes the form of a flat plate; however, the electrolyte layer 2 may assume the form of, for example, a cylinder or a flat cylinder.

DESCRIPTION OF REFERENCE NUMERALS

1: fuel cell apparatus
2: electrolyte layer
3: fuel cell
8: fuel cell stack
12, 13: interconnector
14: cathode layer
15: anode layer
18, 19: current-collecting members
19a: connector contact portion
19b: cell contact portion
19c: connection portion
20: single cell
46a to 46f: tightening member
58: spacer

The invention claimed is:

1. A fuel cell comprising:
a pair of interconnectors;
a single cell located between the interconnectors and having an electrolyte layer and electrode layers formed on upper and lower surfaces, respectively, of the electrolyte layer; and
current-collecting members disposed between the electrode layers and the interconnectors, respectively, and adapted to electrically connect the corresponding electrode layers and interconnectors;
the fuel cell being characterized in that
the current-collecting member corresponding to at least one of the electrode layers comprises a connector contact portion in contact with the interconnector, a cell contact portion in contact with the electrode layer of the single cell, a connection portion connecting the connector contact portion and the cell contact portion, and a spacer disposed between the connector contact portion and the cell contact portion;
an end of the spacer located opposite the connection portion protrudes from at least one of an end of the cell contact portion located opposite the connection portion and an end of the connector contact portion located opposite the connection portion; and
a material of the spacer is more flexible in a thickness direction than the current-collecting members.

2. A fuel cell according to claim 1, wherein the end of the spacer located opposite the connection portion protrudes from both of the end of the cell contact portion located opposite the connection portion and the end of the connector contact portion located opposite the connection portion.

3. A fuel cell according to claim 1, wherein, as viewed in plane, at least a portion of the current-collecting member opposite the current-collecting member corresponding to the one electrode layer is in contact with the other electrode layer in a region where the spacer is in contact with the cell contact portion and with the connector contact portion.

4. A fuel cell according to claim 1, wherein, as viewed in plane, the entire region of contact between the cell contact portion and the electrode layer is contained in a region of the spacer.

5. A fuel cell according to claim 1, wherein the spacer is of at least one of mica, alumina felt, vermiculite, carbon fiber, silicon carbide fiber, and silica.

6. A fuel cell according to claim 1, further comprising a tightening member for unitarily tightening a stack of the interconnectors, the single cell, and the current-collecting members, wherein the tightening member and the spacer press the cell contact portion of the current-collecting member against the single cell and the connector contact portion of the current-collecting member against the interconnector.

7. A fuel cell according to claim 6, wherein the spacer is higher in thermal expansion coefficient in a tightening direction than the tightening member.

8. A fuel cell according to claim 1, wherein at least one of the current-collecting members is formed of a porous metal, a metal mesh, wire, or a punched metal.

9. A fuel cell according to claim 1, wherein the cell contact portion of the current-collecting member is joined to a surface of the electrode layer of the single cell.

10. A fuel cell according to claim 1 wherein the connector contact portion of the current-collecting member is joined to the interconnector.

11. A fuel cell according to claim 1, wherein the current-collecting member is disposed between the electrode layer corresponding to fuel gas and the interconnector and is formed of Ni or an Ni alloy.

12. A fuel cell stack characterized in that a plurality of the fuel cells according to claim 1 are stacked and fixed together by a tightening member.

13. A fuel cell according to claim 1, wherein the electrolyte layer assumes a plate-like form.

* * * * *